Patented Oct. 8, 1946

2,409,001

UNITED STATES PATENT OFFICE 2,409,001

ESTERS OF DIMETHYLAMINOETHANOL USEFUL AS LOCAL ANESTHETICS

Robert S. Shelton, Mariemont, and Marcus G. Van Campen, Jr., Silverton, Ohio, assignors to The Wm. S. Merrell Company, Cincinnati, Ohio, a corporation of Delaware No Drawing. Application May 21, 1943, Serial No. 487,968

2 Claims. (Cl. 260—472)

This invention relates to new urethane esters which are of value for infiltration and spinal anesthesia. The products have low toxicity, cause little irritation and are active in low concentrations, e. g., 0.5 to 1%. The activity of the compounds applied topically, for example, when instilled in the eye or applied to mucous membranes is relatively low.

The new compounds of the invention may be represented by the general formula:

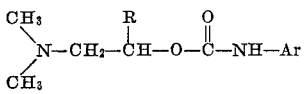

in which R is hydrogen or methyl and Ar represents the phenyl group or a substituted phenyl group including bromphenyl, methoxyphenyl, ethoxyphenyl, aminophenyl, tolyl, alpha or beta-naphthyl, and the like. Of particular advantage are the compounds in which Ar is the unsubstituted phenyl group. The new compounds may be prepared as free bases or in the form of acid addition salts. One of their advantages is that many of them, in aqueous solution, can be adjusted to a pH of 7 or higher with suitable buffer salts and yet be present in sufficient concentration to be therapeutically useful.

The new compounds are readily prepared by reacting beta-dimethylaminoethanol or beta-dimethylaminoisopropanol with phenylisocyanate or a substituted phenylisocyanate, for example, p-bromphenylisocyanate or p-phenetylisocyanate with formation of the corresponding urethane. The reaction is advantageously carried out in an inert solvent such as dry ether or benzene, and the base obtained is usually purified by crystallization as the hydrochloride or other acid addition salt, although the free base may be isolated as such by distilling off the solvent. The free base so isolated may be converted to an acid salt as by dissolving in water with an equivalent amount of acid such as boric, acetic, hydrocinnamic, tartaric, sulfuric, sulfamic, or other acid.

The preparation of the new products will be further illustrated by the following specific examples but it is not limited thereto.

*Example I.*—To 89 parts of beta-dimethylaminoethanol dissolved in 700 parts of dry ether is added 119 parts of phenylisocyanate, with stirring. The mixture is refluxed for an hour, cooled and saturated with hydrogen chloride. The hydrochloride of beta-dimethylaminoethyl carbanilate crystallizes out, is filtered and purified by recrystallization from butanone containing 2 or 3% of water. 180 parts of hydrochloride M. P. 158° are obtained. Instead of adding hydrogen chloride to the reaction mixture, the ether may be distilled off leaving the free base as an oil, which can be dissolved in water and neutralized with an acid, such as those described above. The borate of this compound is particularly valuable.

*Example II.*—Beta-dimethylaminoethanol dissolved in benzene or ether is reacted with an equimolar proportion of p-nitrophenylisocyanate. The p-nitrophenylisocyanate should be added slowly and dissolved in ether or benzene, as the reaction is vigorous. The resulting solution is treated with a slight excess of alcoholic hydrogen chloride and the precipitated beta-dimethylaminoethyl p-nitrocarbanilate hydrochloride (M. P. 230–232°) separated by filtration and recrystallized from alcohol. This compound can be reduced to the corresponding amino compound by catalytic reduction with any of the usual catalysts. Palladium supported on charcoal is convenient. At a pressure of three atmospheres with this catalyst the reduction proceeds rapidly and gives nearly quantitative yields. Beta-dimethylaminoethyl p-aminophenylurethane dihydrochloride can be isolated by evaporating and cooling the alcohol used as a solvent after adding a slight excess of hydrogen chloride.

Other compounds such as the corresponding p-ethoxycarbanilate, p-bromcarbanilate, alpha and beta-naphthyl carbamate and the corresponding derivatives of beta-dimethylaminoisopropanol are readily prepared in a similar manner. Included are the following:

| | Melting point |
|---|---|
| Beta-dimethylaminoethyl p-ethoxycarbanilate hydrochloride | 186–188 |
| Beta - dimethylaminoethyl p - bromcarbanilate hydrochloride | 171–173 |
| Beta-dimethylaminoethyl p-aminocarbanilate hydrochloride | 216–218 |
| Beta - dimethylaminoethyl α - naphthyl urethane hydrochloride | 173–175 |
| Beta-dimethylaminoethyl isopropyl phenylurethane hydrochloride | 145 |
| Beta - dimethylaminoethyl β - naphthyl urethane hydrochloride | 164–165 |

We claim:

1. Compounds of the formula

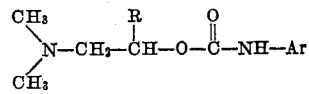

in which R is a radical from the group consisting of hydrogen and methyl and Ar is a phenyl radical.

2. Beta - dimethylaminoethyl, N - phenylurethane.

ROBERT S. SHELTON.
MARCUS G. VAN CAMPEN, Jr.